United States Patent

Smith

[11] 3,918,253
[45] Nov. 11, 1975

[54] FUEL SYSTEM FOR A GAS TURBINE ENGINE

[75] Inventor: Trevor Stanley Smith, Sutton Coldfield, England

[73] Assignee: Lucas Aerospace Limited, Birmingham, England

[22] Filed: Apr. 30, 1974

[21] Appl. No.: 471,720

[30] Foreign Application Priority Data
May 16, 1973 United Kingdom............ 23265/73

[52] U.S. Cl............................................ 60/39.28 R
[51] Int. Cl.²...................... F02C 9/08; F02C 9/10
[58] Field of Search .............................. 60/39.28 R

[56] References Cited
UNITED STATES PATENTS

| | | | |
|---|---|---|---|
| 2,686,561 | 8/1954 | Isreeli............................ | 60/39.28 R |
| 3,420,055 | 1/1969 | Lavash.......................... | 60/39.28 R |
| 3,475,910 | 11/1969 | Wayne.......................... | 60/39.28 R |
| 3,695,038 | 10/1972 | Greiner......................... | 60/39.28 R |

Primary Examiner—Clarence R. Gordon
Attorney, Agent, or Firm—Holman & Stern

[57] ABSTRACT

A gas turbine engine fuel control system has a main throttle valve and a servo-operated throttle valve downstream of the main throttle valve. The servo-operated throttle vlave is responsive only to the pressure drop across the main throttle valve, and thus acts as an integrator of variations in the main valve pressure drop. The arrangement provides a control system having a fast response to maintain the pressure drop across the main valve substantially constant for any given setting of that valve.

7 Claims, 1 Drawing Figure

U.S. Patent    Nov. 11, 1975    3,918,253
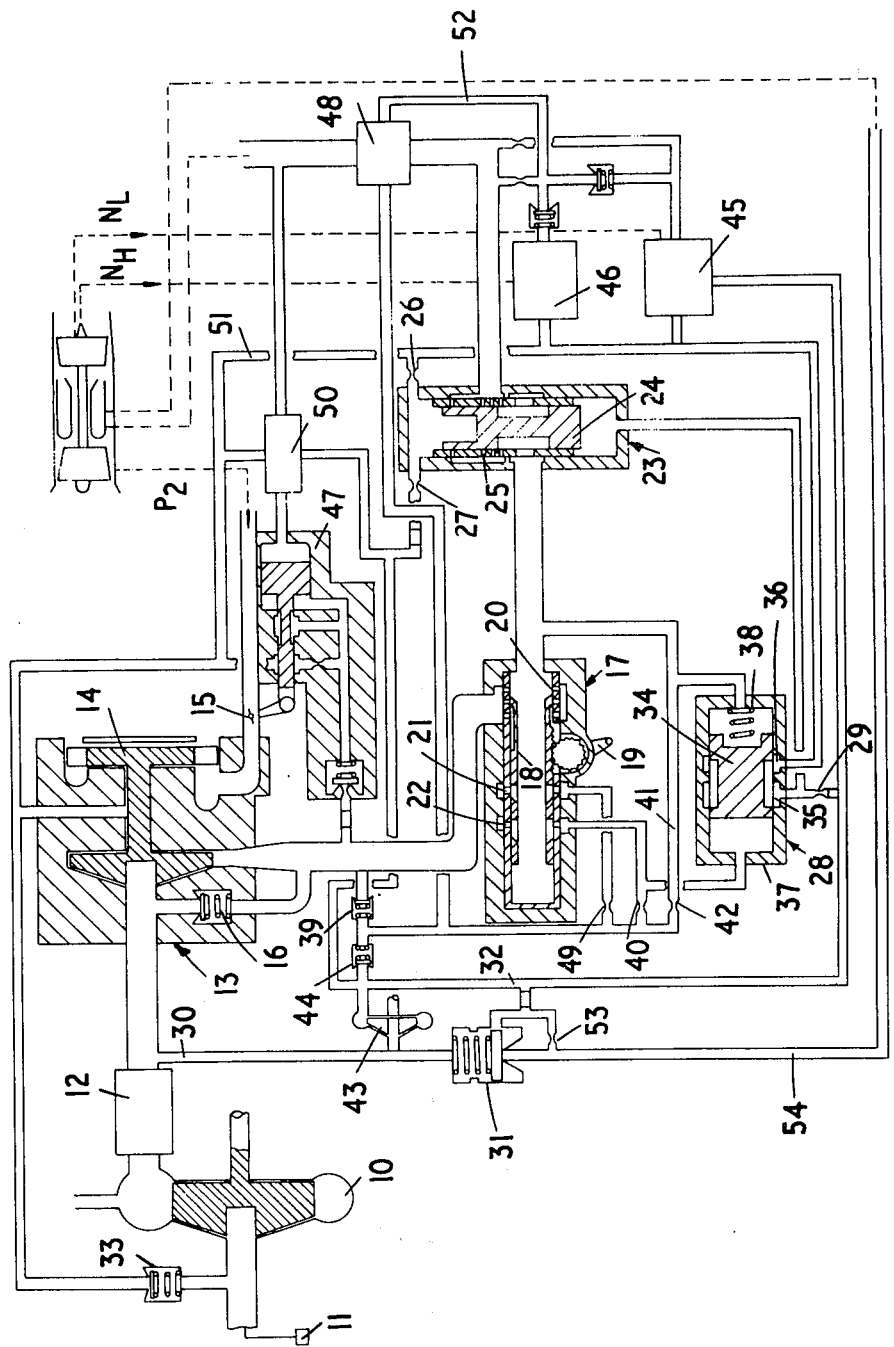

FUEL SYSTEM FOR A GAS TURBINE ENGINE

This invention relates to a fuel control system for a gas turbine engine.

It has already been proposed to produce a gas turbine engine fuel control system including a fuel pump, a main throttle valve having a mechanical input member movable to vary the resistance of the main throttle valve to fuel flow therethrough, a servo-throttle valve in series with the main throttle valve and pressure drop sensing valve arranged to detect the pressure drop across the main throttle valve and produce a servo-pressure which is applied to the servo-throttle valve to adjust the setting of the latter and thereby to vary the flow through the main throttle valve until the said pressure drop attains a predetermined value.

It has been found that known types of such systems cannot be made to meter the fuel with a high degree of accuracy unless the loop gain of the system is made so high that instability arises.

A fuel control system in accordance with the invention includes a pump, a main fuel throttle valve having a control member movable to vary the resistance thereof to fuel flow, a servo-throttle valve including a spool controlling ports connected in series with the main throttle valve, a first fluid flow circuit connected between the outlet of the pump and the inlet of the pump and including a pair of flow restrictors in series, one end of the servo-throttle valve spool being acted upon by the pressure existing intermediate said flow restrictors a pressure-drop sensitive valve having a spool the two ends of which are acted upon by pressures derived from the pressures existing respectively upstream and downstream of the main throttle valve, the pressure-drop sensitive valve controlling two ports connected respectively to the outlet of the pump via a third flow restrictor and to the inlet of the pump, the other end of the servo-throttle valve spool being acted upon by a servo control pressure intermediate the further restrictor and the pressure-drop sensing valve, the said pressures acting on the ends of the servo-throttle valve spool being substantially the only forces on said spool.

An example of the invention is illustrated diagrammatically in the accompanying drawing.

The example shown is similar to that described in our prior British patent specification No. 1,205,553.

The system shown includes a two stage fuel pump comprising a first stage pump 10 the inlet of which is connected to the tank 11 and the outlet of which is connected via a combined filter and oil cooler 12 to the second stage pump 13. The system is intended to control a twin spool gas turbine engine and the pump 10 is driven by the high pressure spool of the engine so that its output pressure is related to the high pressure spool speed NH. The pump 13 is driven by an air turbine 14 which is driven by air at a pressure $P_2$ from the first stage compressor of the engine and controlled by an air throttle valve 15. A by-pass valve 16 is provided so that the second stage pump 13 can be by-passed when not in use.

The outlet of the second stage pump 13 is connected to a main throttle valve 17 which has a spool 18 movable by an actuator 19 to control the flow through ports 20. The main throttle valve spool 18 also has an auxiliary control port 21, which is open when ports 20 are shut and which control fuel flow during engine idling. A further auxiliary control port 22 provides a pressure drop signal which will be hereinafter explained.

The outlet of the main throttle valve 17 is connected to the inlet of a servo-throttle valve 23 which has a spool 24 controlling fuel flow through ports 25. The spool 24 has no spring loading and is in equilibrium whenever the pressures acting on its two ends are equal. These pressures are respectively generated by a fluid circuit containing a pair of fixed restrictors 26, 27 and by a pressure drop sensing valve 28 combined with a further fixed flow restrictor 29.

To provide a source of fuel to operate the servo-throttle valve 23, a tapping 30 is taken from the outlet of the pump 10 downstream of the filter/oil cooler 12. This tapping 30 is connected via an electrically driven starting pump 43 to a servo-supply line 32 which is in turn connected via the restrictors 27, 26 in series to the inlet of the pump 10 via a low pressure return line 51 and a non-return valve 33. One end of the spool 24 is subjected to the pressure existing intermediate the restrictors 26, 27. The line 32 is connected via a restrictor 53 and a line 54 to the engine igniters. Restrictor 53 can be by-passed by a spring-loaded valve 31 which opens when the pressure in line 54 overcomes the spring loading.

The pressure drop sensing valve 28 has a spool 34 which controls the connection between two grooves 35, 36 inside the body 37 of the valve 28. A spring 38 urges the spool 34 to the left as viewed in the drawing tending to cut off the connections between grooves 35, 36. The left hand end of the spool 34 is acted upon by pressure derived from the pressures upstream of the main throttle valve 17. To this end a non-return valve 39 connects the outlet of the pump 13 via a restrictor 40 to the port 22 of the main throttle valve, which acts as a variable flow restrictor. Between the restrictor 40 and the port 22 there is thus generated a pressure signal related both to the pressure upstream of valve 17 and to position of the spool 18 and it is this pressure signal which is applied to the left hand end of the spool 34.

The pressure on the right hand end of the spool 34 is the pressure downstream of the main throttle valve 17. Thus the position of the spool 34 will be related to the pressure drop through the valve 17, the effect of such pressure drop being opposed by the spring 38. Thus communication between the grooves 35, 36 becomes progressively less restricted as the pressure drop increases.

The groove 35 is connected via the restrictor 29 to the supply line 32 and the groove 36 is connected to the inlet of pump 10 via the non-return valve 33. Thus the pressure intermediate the restrictor 29 and the groove 35 will be determined by the pressure drop across the valve 17 and it is this pressure which acts on the opposite end of the valve spool 24.

It will be appreciated that the valve spool 24 acts as an integrator and its position at any time is the integral of displacements of the piston 34 caused by past fluctuations in the pressure signals applied to the piston 34. In steady state conditions the spool 24 will occupy a position such that the flow through valve 17 produces a pressure drop which positions the spool 34 to make the pressures at opposite ends of the spool 24 equal. Fluctuation of the upstream pressure on valve 17 cuases corresponding changes in the position of valve spool 34 which in turn cause corresponding changes in the position of valve spool 24 to maintain equilibrium with the flow through the valve 17 unaltered. Similarly changes in the position of the spool 18 are followed by corresponding changes in the positions of spools 34 and 24 to restore equilibrium with a different flow rate producing the same pressure drop through valve 17.

The port 21 of valve 17 provides a flow path for fuel during idling, when the main ports 20 are closed. A variable restrictor 49 is provided in series with ports 21 for adjusting the idling fuel supply. A by-pass 41 is provided to permit fuel to by-pass the valve 17 during engine starting, a variable restrictor 42 being provided in this by-pass 41. A separate electrically driven starter pump 43 is connected to the line 32 and is also connected, via a non-return valve 44, to the restrictor 40. Pump 43 is provided for producing the required fuel flow and servo-pressure signals during starting. The pump 43 draws fuel from the tapping 30.

The outlet of the valve 23 is connected to the engine burners through the intermediary of a shut-off cock 48 and a distributor (not shown). Flow through the shut-off cock 48 is variable in response to the pressure in a line 52. For speed control there are two governors 45 and 46 sensitive to the speeds of the low pressure and high pressure engine spools respectively. The low pressure governor 45 is controlled by an electrical input which is dependent on the speed NL of the low pressure turbine, and the high pressure governor 46 is mechanically driven by the high pressure turbine. The two governors influence the rate of fuel flow to the engine by varying the control pressure in line 52 to the shut-off cock 48.

The air turbine throttle valve 15 is controlled by a piston 47 which is operated by a servo-pressure derived from a control valve 50 responsive to the total pressure drop through the main throttle valve 17, the servo-throttle valve 23 and the shut-off cock 48.

The system described attains rapid and accurate adjustment of the servo-throttle valve 23 without incurring latent instability by introducing an excessively high loop gain.

I claim:

1. A fuel control system for a gas turbine engine, including a pump, a main fuel throttle valve having a control member movable to vary the resistance thereof to fuel flow, a servo-throttle valve including a spool controlling ports connected in series with the main throttle valve, a first fluid flow circuit connected between the outlet of the pump and the inlet of the pump and including a pair of flow restrictors in series, one end of the servo-throttle valve spool being acted upon by the pressure existing intermediate said flow restrictors, a pressure-drop sensitive valve having a spool the two ends of which are acted upon by pressures derived from the pressures existing respectively upstream and downstream of the main throttle valve, the pressure-drop sensitive valve controlling flow between two ports therein, a third flow restrictor connected between one of said ports and the outlet of the pump, the other of said ports being connected to the inlet of the pump, said pressure-drop sensitive valve and said third flow restrictor forming part of a second fluid flow circuit also connected between the outlet of the pump and the inlet of the pump, the other end of the servo-throttle valve spool being acted upon by a servo control pressure intermediate said third restrictor and the pressure-drop sensing valve, said pressures acting on the ends of the servo-throttle valve spool being substantially the only forces on said spool.

2. A fuel control system as claimed in claim 1 in which said main throttle valve has first and second metering orifices through which fuel can flow from said pump to the engine, and there is provided a fourth flow restrictor between said second metering orifice and the outlet of said pump, said pressure-drop responsive valve being responsive to the pressure between said fourth restrictor and said second metering orifice to reduce the flow between said two ports.

3. A fuel control system as claimed in claim 2 in which said main throttle valve has a third metering orifice through which fuel can flow from said pump to the engine when said first metering orifice is shut.

4. A fuel control system as claimed in claim 1 which includes a further pump in series with the first-mentioned pump, said further pump being driven, in use, by air from a compressor of the engine, and an air control valve for regulating airflow to said further pump, said air-control valve being responsive to the pressure difference between the upstream side of the first-mentioned pump and a point downstream of said servo-throttle valve.

5. A fuel control system as claimed in claim 4 which includes a valve for by-passing said further pump.

6. A fuel control system as claimed in claim 1 which includes means for providing a control pressure dependent on the speed of the engine, and a shut-off valve downstream of said servo-throttle valve, said shut-off valve being responsive to said control pressure to regulate fuel flow to the engine.

7. A fuel control system as claimed in claim 6 in which the means for providing said control pressure comprises a speed-responsive valve and an associated flow restrictor in series between the downstream side of said servo-throttle valve and the upstream side of the first-mentioned pump, said control pressure being derived from a point intermediate said speed-responsive valve and to its associated flow restrictor.

* * * * *